United States Patent [19]

Rebreyend

[11] Patent Number: 4,988,401

[45] Date of Patent: Jan. 29, 1991

[54] PROCESS FOR STICKING RUBBER TO ALUMINUM

[75] Inventor: Catherine Rebreyend, Egreve, France

[73] Assignee: Cegedur Pechiney Rhenalu, Paris, France

[21] Appl. No.: 362,108

[22] Filed: Jun. 6, 1989

[30] Foreign Application Priority Data

Jun. 15, 1988 [FR] France .............................. 88 08476

[51] Int. Cl.$^5$ .............................................. C09J 5/02
[52] U.S. Cl. .................................... 156/326; 156/281; 428/447; 428/448
[58] Field of Search .................... 156/307.5, 326, 281; 204/33; 428/472.2, 465, 447, 448

[56] References Cited

U.S. PATENT DOCUMENTS

| | | | |
|---|---|---|---|
| 2,096,309 | 10/1937 | Pullen | 204/33 |
| 3,166,444 | 1/1965 | Ehren et al. | 204/33 X |
| 3,200,885 | 8/1965 | Johnson | 428/465 X |
| 3,565,771 | 2/1971 | Gulla | 204/33 |
| 3,585,103 | 6/1971 | Thomson | 156/326 X |
| 4,059,473 | 11/1977 | Okami | 156/329 X |
| 4,231,910 | 11/1980 | Plueddemann | 156/329 X |
| 4,566,952 | 1/1986 | Sprintschnik et al. | 204/38.3 X |
| 4,624,752 | 11/1986 | Arrowsmith et al. | 204/33 X |
| 4,709,781 | 12/1987 | Scherzer | 428/465 X |

Primary Examiner—Michael W. Ball
Assistant Examiner—Mark A. Osele
Attorney, Agent, or Firm—Dennison, Meserole, Pollack & Scheiner

[57] ABSTRACT

The invention relates to a process for adhering rubber to aluminium. The process comprises a succession of steps: anodization of the surface of the aluminium which is intended to be brought into contact with the rubber; treatment of the anodized surface with a solution of silane mercaptan in an organic solvent; followed by drying; and applying the rubber to be adhered while the treated surface is hot. The invention finds application in the production of all aluminium-rubber composites and in particular those which form guides for automobile door windows.

9 Claims, No Drawings

PROCESS FOR STICKING RUBBER TO ALUMINUM

This invention relates to a process for sticking rubber to aluminium.

Hereinafter the term aluminium is used to denote the element itself with its usual impurities as well as alloys thereof while the term rubber is used to denote natural rubber, vulcanisable synthetic rubbers and mixtures thereof. Those products may occur in the form of thin sheets, strips, slabs and moulded parts of any thickness.

The application of rubber to a metal substrate such as aluminium or the reverse is well known in many areas in industry. It is used for example for producing solid tires for wheels, sound-proofing strips, vibration insulators, coatings for reservoirs or cylinders for offset printing, slides for automobile windows, magnetised blocks for closing doors, etc.

The attraction of such an application arises out of the fact that the composite material which results therefrom has both the mechanical strength properties of metal and the elastic and/or chemical inertia properties of rubber.

However, in order for the composite material fully to develop the above-mentioned properties, the components thereof must bond perfectly to each other and that bond must be maintained with the passage of time, irrespective of the severity of the stresses to which it is subjected in use thereof, such as: substantial tensile, compression and shearing forces, elevated temperature, rapid thermal cycles of large magnitude, humid and corrosive media, etc. That is one of the major problems with which the manufacturers of such composite materials are faced.

It is true to say that solutions have been put forward hitherto. Mention may be made for example of the use of a commercially available product bearing the mark "CHEMOSIL", being a kind of lacquer which is deposited at the surface of the aluminium by spraying and then baked for 3 minutes at 200° C. and 4 to 5 minutes at 160° C., those operations being repeated to give a film which is approximately 5 $\mu$m in thickness to which the rubber is then applied. Besides its relatively high cost, that product suffers from the disadvantage of emitting noxious vapours when it is handled and baked and causing difficulties and discomfort in certain workshops for the operating personnel.

Being aware of those disadvantages and wishing to find a simple solution to the problem of sticking rubber to aluminium which makes it possible for the interface of the components to be maintained unchanged irrespective of the severity of the stresses to which the composite materials produced are subjected, the applicants sought and developed a process which is characterised in that the surface of the aluminium which is intended to be brought into contact with the rubber is anodised in a sulphuric medium and then treated with a solution of silane mercaptan in an organic solvent and then dried and applied in the hot condition to the rubber.

The invention thus comprises a succession of steps, in the course of which the aluminium surface to which the rubber is to be applied is first chemically degreased and then anodised in a sulphuric medium with direct current under conditions which are well known to the man skilled in the art.

Those conditions, some of which are interdependent, are so adjusted as to develop a layer of oxide which is preferably between 2 and 5 $\mu$m in thickness. The anodised surface is then subjected to the action of a solution of organic solvent preferably containing between 1 and 5% by weight of silane mercaptan, that action being achieved either by spraying of the solution onto the surface or by dipping the aluminium into a bath formed by said solution. Among silane mercaptans, use is preferably made of those which are of the general formula $HS(CH_2)_n—Si—(O\ R_1)_3$ wherein n is between 2 and 5 and $R_1$ is an alkyl group having from 1 to 4 carbon atoms and more particularly that in which n=3 and $R_1$ corresponds to the methyl radical $—CH_3$.

As regards the drying operation, it is carried out in air at about 100° C. for the period of time required to cause total evaporation of the solvent.

The rubber component, which is used as it is, is then applied directly to the aluminium surface which has been treated in the above-indicated way. The application operation is effected at a temperature of between 200° and 250° C. for a period of at least two minutes simply by depositing the rubber on the anodised layer and without any pressure except that resulting from the weight of the rubber itself. It will be apparent that such an application operation can also be carried out by co-extrusion when the composite material requires such a procedure for shaping it.

The invention finds application in the production of all aluminium-rubber composites and in particular those which form the assemblies for sliders for automobile doors.

The invention may be illustrated by reference to the following embodiment. Aluminium-rubber assemblies for automobile window sliders were produced in the following manner: the components of aluminium of type 1050 in accordance with the standards of the Aluminium Association were degreased and then pickled with soda so as to remove a thickness of metal of between 15 and 20 $\mu$m, then they were anodised with direct current in a sulphuric medium at a temperature of between 42° and 43° C., the other conditions in regard to duration and current density being such that the final oxide thickness obtained was close to 3 $\mu$m.

The components were then dipped into a bath of kerosene containing 3% by weight of silane of the composition $HS(CH_2)_3\ Si(OCH_3)_3)_3$ so as to form a continuous thin film, and then removed from the bath and dried for 10 minutes at 100° C. The rubber component of the silicone type was then applied without pressure and without particular treatment to the aluminium surface obtained in that way for 3 minutes at 240° C.

The composite components produced in that way were subjected to different tests:
1. A peeling test after being held at 80° C. for 7 days: cohesive rupture was observed, that is to say the rubber breaks while the aluminium-rubber interface remains intact.
2. Durability tests: they were carried out in three different ways:
   application of 2 thermal cycles comprising the following steps: 4 hours at 100° C.—4 hours at 38° C.—16 hours at 40° C.—4 hours at 38° C.—4 hours at 100° C.—16 hours at 40° C.;
   the components were kept in a saline mist containing 5% of NaCl by weight for 500 hours;
   the components were kept for a period of 72 hours at 38° C. in air with a humidity content of 95%.

In all cases, adhesion of the composite material was unaltered, rupture of the composite material always being cohesive.

I claim:

1. A process for adhering rubber to an aluminum surface, comprising the steps of:
   anodizing the surface of the aluminum which is to be adhered to the rubber;
   treating said anodized surface with a solution consisting essentially of a silane mercaptan in an organic solvent;
   causing substantially total evaporation of said organic solvent; and
   subsequently, depositing said rubber directly on said silane mercaptan treated surface and maintaining at a temperature of about 200°-250° C. for at least two minutes without application of pressure to adhere said rubber to said aluminum surface.

2. A process according to claim 1, wherein the aluminum surface is first degreased and then pickled with soda, prior to anodizing.

3. A process according to claim 1, comprising anodizing to develop a film of oxide of a thickness of between 2 and 5 μm.

4. A process according to claim 1, wherein the silane mercaptan is of the general formula $HS(CH_2)_n-Si-(OR_1)_3$ in which n is equal to 2 or 3 and $R_1$ is an alkyl group having from 1 to 4 carbon atoms.

5. A process according to claim 4 wherein the formula of the silane mercaptan is $HS(CH_2)_3-Si-(OCH_3)_3$.

6. A process according to claim 1, wherein the proportion of silane in the solvent is between 1 and 5% by weight.

7. A process according to claim 1, wherein the treatment with the solution of silane mercaptan is effected by spraying said solution onto the surface of the aluminum.

8. A process according to claim 1, wherein the treatment with the solution of silane mercaptan is effected by dipping into a bath of said solution.

9. A process according to claim 1, wherein the evaporation operation is carried out in the vicinity of 100° C. for the period of time required to cause complete evaporation of the solvent.

* * * * *